(12) United States Patent
Pendse et al.

(10) Patent No.: US 8,065,691 B2
(45) Date of Patent: Nov. 22, 2011

(54) USER CUSTOMIZED PORTABLE DESKTOP

(76) Inventors: Sudhir Pendse, Los Altos, CA (US); Han Nguyen, Fremont, CA (US)

(*) Notice: Subject to any disclaimer, the term of this patent is extended or adjusted under 35 U.S.C. 154(b) by 632 days.

(21) Appl. No.: 11/922,938

(22) PCT Filed: Apr. 14, 2006

(86) PCT No.: PCT/US2006/014080
§ 371 (c)(1),
(2), (4) Date: Dec. 27, 2007

(87) PCT Pub. No.: WO2007/005087
PCT Pub. Date: Jan. 11, 2007

(65) Prior Publication Data
US 2009/0210794 A1    Aug. 20, 2009

Related U.S. Application Data

(60) Provisional application No. 60/695,981, filed on Jul. 1, 2005, provisional application No. 60/695,980, filed on Jul. 1, 2005.

(51) Int. Cl.
*G06F 13/00* (2006.01)

(52) U.S. Cl. ........................ 719/331; 719/332
(58) Field of Classification Search .................. 719/331, 719/332
See application file for complete search history.

(56) References Cited

U.S. PATENT DOCUMENTS

| 6,085,030 | A * | 7/2000 | Whitehead et al. ........... 709/203 |
| 6,442,752 | B1 * | 8/2002 | Jennings et al. ............. 717/162 |
| 6,779,187 | B1 * | 8/2004 | Hammond .................... 719/331 |
| 2005/0198652 | A1 * | 9/2005 | Huscher et al. ............... 719/331 |

* cited by examiner

*Primary Examiner* — Andy Ho

(57) ABSTRACT

The invention provides a portable customizable desktop environment, enabling a User to replicate and use the User's preferred desktop configuration on any computing device by means of an enabled portable memory device such as USB drive. Further, the portable desktop can be encapsulated, such that little if any trace of the use of the portable desktop are glean-able from the host computer. Also provided is a method of learning to duplicate a program's environment requirements within the portable desktop environment. The invention further provides a means for providing universal synchronization of a portable customized desktop, thereby preserving data and providing alternate access by User.

5 Claims, 6 Drawing Sheets

USER CUSTOMIZED PORTABLE DESKTOP

RELATED APPLICATIONS

This application is related to and claims priority from U.S. provisional application No. 60/695,981 filed Jul. 1, 2005, and U.S. provisional application No. 60/695,980 filed Jul. 1, 2005, both incorporated by reference as if fully set forth herein.

GOVERNMENT FUNDING

Not applicable.

BACKGROUND

Individuals tend to arrange their graphical interface "desktop" to suit their work habits and practice. As individuals become more mobile, they increasingly need to carry out their computing tasks from many locations. When using a device other than one's "home" device (laptop, notebook computer, etc.) one most often encounters a different desktop environment. What is desired is a means of providing Users a consistent desktop environment, providing similar look and feel and functionality regardless of the computing device providing an interface.

To be useful to a mobile user, such a portable desktop environment should include the most commonly used programs (in their entirety), data files, environment settings in addition to the graphical desktop that can be used to launch the applications. What is also desired is a means to synchronize portable device environments, data and applications. Further desired is a) a means to learning the dependencies of a program for duplication in the portable desktop environment and b) a means for carrying out the work in the portable desktop environment in such a way so copies are not left in the host computer.

BRIEF SUMMARY OF THE INVENTION

The invention provides a means of providing Users a consistent "desktop" look and feel and functionality regardless of the computing device providing an interface. The invention provides a portable desktop environment, including the most commonly used programs, data files, and environment settings in addition to the graphical desktop that can be used to launch the applications.

The invention further provides a desktop paradigm providing capabilities including universally syncing up the desktop environment as a whole. The invention further provides a means for a universal sync up of portable device environments, data and applications.

The invention further provides a means to preserve any User creation or modifications performed in a portable environment without leaving copies of User files in the host computer. Also provided is a method of learning application dependencies in the environment of a host computer, such that the portable environment can duplicate such dependencies, enabling the application to be run by the portable device on any potential host computer.

DETAILED DESCRIPTION OF THE PREFERRED EMBODIMENT

Figure 1:
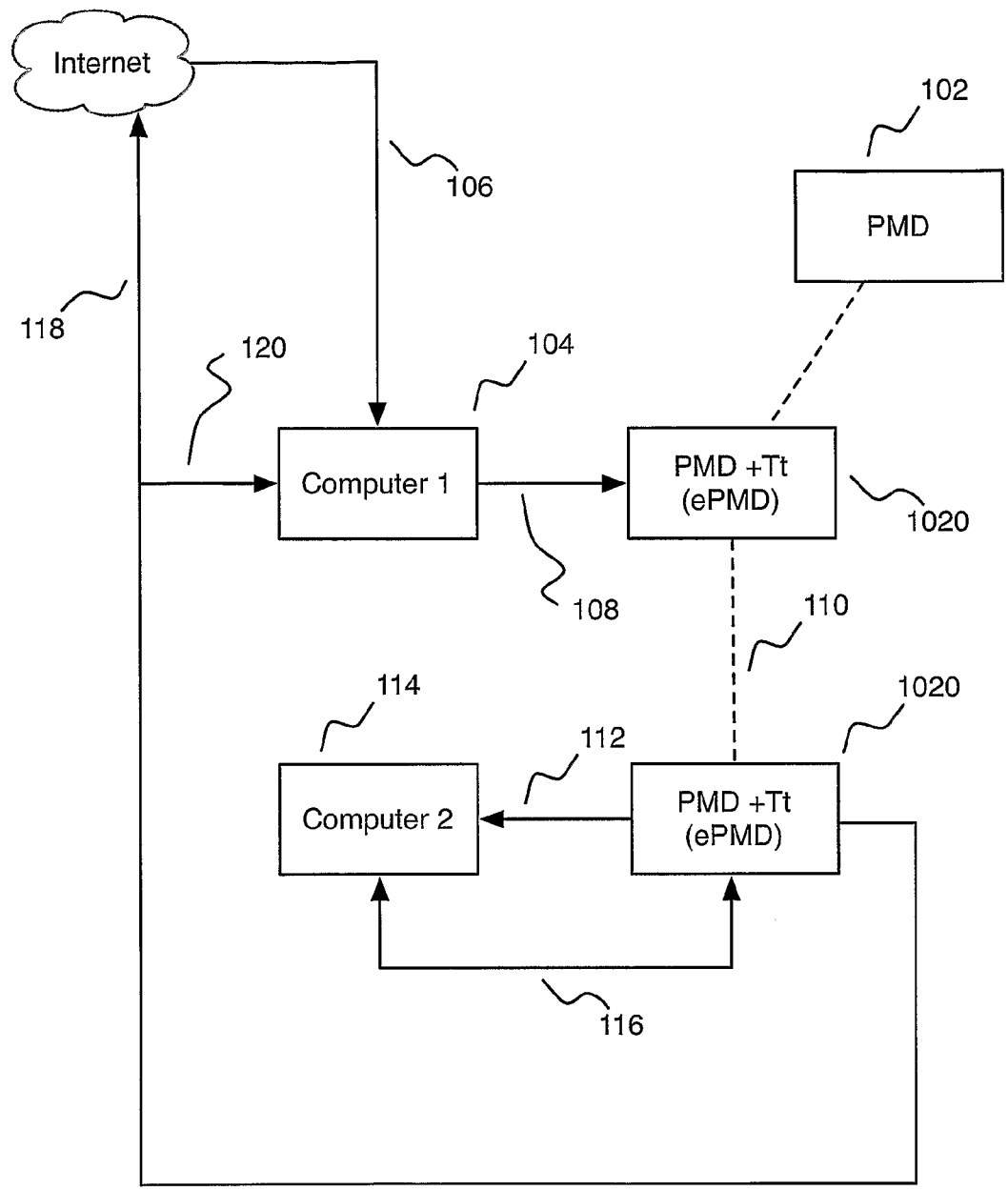
FIG. 1 is a system overview of the preferred embodiment.

Introductory remarks. The invention taught herein, especially the preferred embodiment, will be explained in three sections. The order is as follows: first, the portable customizable desktop known as "Thumbtop"; second, a synchronization means by which the User updates or synchronizes his or her Thumbtop files with "home" files; third, a method of learning and encapsulation by which the Thumbtop duplicates a program environment, and prevents contamination of the host device upon which the Thumbtop portable desktop may be run.

The preferred embodiment of the present invention is set forth herein below and further explained by means a Thumbtop™ User Guide is attached hereto as Appendix A, filed herewith, and incorporated by reference as if fully set forth herein. The invention provides a means for creating and maintaining a portable, User customized desktop. In the text below, this portable customized desktop is identified as "Thumbtop™" and also "Thumbtop" in various portions of the text. The invention includes the underlying software, although it can be appreciated that the invention is not limited to a particular implementation.

The preferred embodiment of the invention provides a portable desktop program along with popular open source applications from Mozilla and OpenOffice.org; the program and applications can be installed on any portable data storage device or portable memory device (commonly referred to herein as "PMD") (e.g., USB memory drive). Once the PMD has been Thumbtop-enabled, we refer to it herein as an "enabled PMD" or ePMD. Applications include the typical User's most commonly used programs like web browsers, email clients, and document, spreadsheet and presentation editors. Additional applications, including (to name just a few) virtual private network (VPN) clients, virtual network computing (VNC) clients, voice over internet protocol (VOIP) clients, instant messengers, and music players can also be added as required.

The invention enables any User to launch applications on a host/home computer in a way that the User's environment and settings (e.g., settings germane to email, POP server settings and browser cookies, to name a few) are preserved on the portable memory device (PMD) itself. When coupled to a host computer, an enabled PMD can re-create the User's desktop. Moreover, settings are preserved on the ePMD and permit a User to move the ePMD from one host machine to another host machine without having to remember and manually enter the settings and configure the host each time.

As used herein, "first computer" and "Home" computer or user environment refer to the initial User computing environment from which the User creates a personalized desktop. "Host" refers to a computing environment subsequent to the Home environment. Of course, the usage herein of such terms is somewhat idiosyncratic (as the "home" environment is, for all practical purposes, a host in the usual meaning). Moreover, when speaking of update User files, we refer to updating the Home or first computer. These are merely euphemisms for expressing the broader notion of a User updating his or her files, whether they are resident on a home computer or elsewhere. Similarly, "synchronize" means "update" according to the User's election or preference. Therefore, the reader is to consider these terms in the context in which they are used as teaching tools to convey the invention, and to appreciate this usage is not meant to be restrictive of the invention.

1. Brief Overview

Referring to FIG. 1, which depicts the overall inventive system 100 the preferred embodiment includes:

Enabling Thumbtop. A first computer 104 and a portable memory device (PMD) 102, are connected such that by means of the connection of the first computer 104 and the PMD, certain computer implement-able instructions and data are transferred 108 to the PMD creating an enabled PMD (ePMD: PMD+Tt=ePMD) An enabled PMD (ePMD 1020) refers to a portable memory device "enabled" with Thumbtop, that is to say, a PMD which a User has personalized according to the invention. The Thumbtop related computer implement-able instructions and data could be downloaded 106 from the Internet.

The ePMD 1020 is removed from connection with the first computer and is subsequently coupled 110 with a second computer 114; the ePMD replicates the desktop 112, that is to say, causes the User's desktop to appear on the display of the second computer 114. The ePMD and the second computer are inter-operably connected 116 and the ePMD harnesses the CPU (central processing unit), I/O devices, and some applications of the second computer as may be required by the User as he/she works on his/her desktop as it is hosted by the second computer.

Synchronizing. The invention provides a means for synchronizing the ePMD with some reference set of User files, such User files may exist in a "home computing environment" located in a web based repository at a synchronization site or on a "home computer". Synchronization is important as a mobile user may host on a computer in a different time zone; the host computer's notion of time must be reconciled in order to determine what files have been modified by the User, and, consequently, require updating during connection to any host computer. The invention provides for reconciliation of timestamps so that the time is "normalized" and files modified or created in the portable environment are synchronized.

The User may cause the synchronization 118 of the contents of ePMD with an internet or web based repository (not depicted) or update the contents of the "home computer" 104 through physical re-connection 120 of the ePMD 1020 and the first computer 104.

Figure 4A:
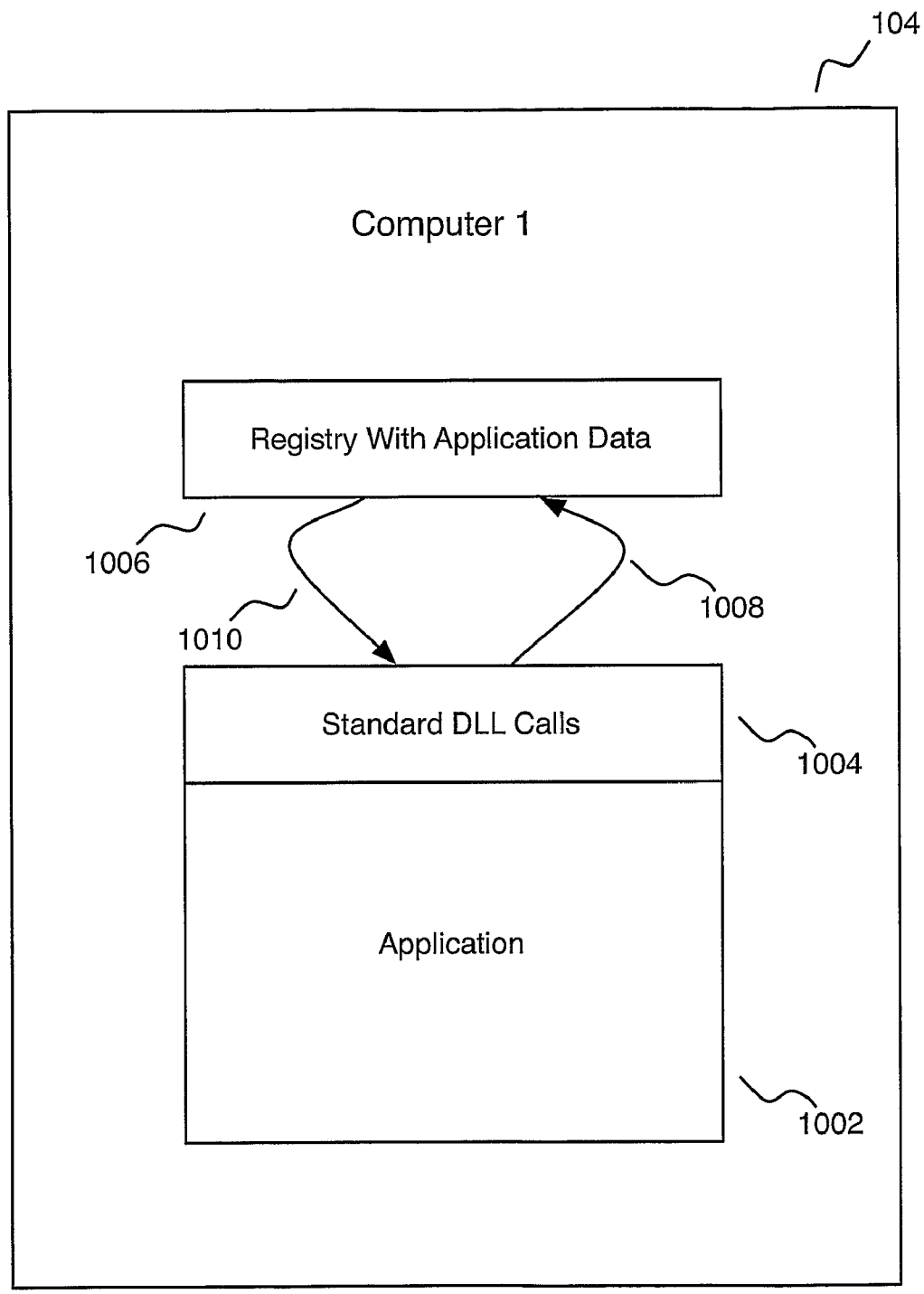
FIGS. 4a, b, and c inclusive, depict learning and encapsulation according to the preferred embodiment.

Encapsulating and Learning. The invention further provides a means for encapsulating the ePMD 1020 such that changes in applications within the runtime environment are saved to the ePMD 1020 and not saved to the host computer or, as in FIG. 1, the second computer 114. The invention further provides a means for the ePMD to learn dependencies of applications in the host/home computer environment, and duplicating such application dependencies in the ePMD environment so that the application is de-coupled from exclusively running on the host/home computer and enabling the ePMD to run the application on any host computer. Encapsulation and learning are depicted in FIGS. 4a, b and c and will be discussed in greater detail after the discussion of the intervening figures.

2. How to Use Thumbtop

Installation. A User can download from a website such as www.Thumbtop.com the computer implement-able instructions (i.e., software) sufficient for a computer to implement the Thumbtop invention. To install Thumbtop on a PMD, a User double-clicks the Thumbtop_setup.exe file and follows the instructions to install the software. The User will be prompted by instructions that appear on the computer screen to install Thumbtop on the PMD.

The Thumbtop software and the synchronization program are automatically selected and installed on the User selected ePMD. The User can select components to be installed on the ePMD during the installation process. Once the installation is completed, the Thumbtop desktop will include the selected components—(refer to FIG. 2, a screen shot 200 depicting the icon choices 220 including FireFox (web browser); Thunderbird (email client); Thumbsync; OpenOffice (Office Suite)).

Launching the Applications: The selected components/applications shown in FIG. 2 can be launched within the Thumbtop environment by simply double clicking on their icons. Thumbtop will create an execution environment for the application to be launched that includes environment variables, runtime directory paths, and command line arguments so that the application's dependencies on the connected host computer are minimized and the changes made by the application are preserved on the ePMD itself as much as possible. New user-specific applications, not included in the Thumbtop installation, can be also be added to Thumbtop environment by specifying new shortcuts and their properties (as described in the User Guide, Appendix A hereto).

Figure 2:
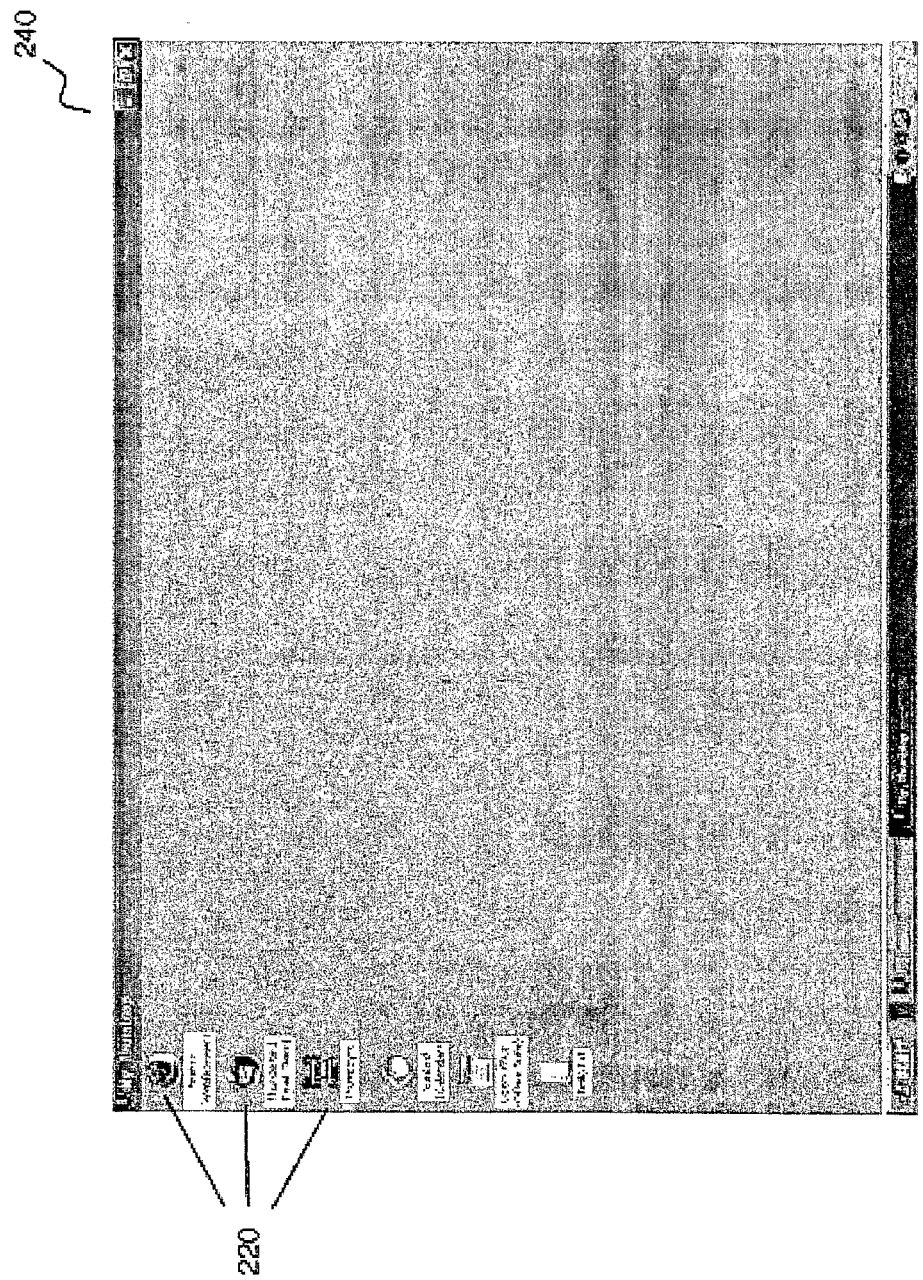
FIG. 2 is an exemplar screen shot according to the preferred embodiment depicting the portable desktop environment and icons.

The background graphics 240 shown in FIG. 2 of the portable Thumbtop environment can also be customized to the User's liking (i.e., display pictures of kids, pets, locations, etc.) so that the familiar look and feel is preserved on any connected computer. The Thumbtop desktop shown in FIG. 2 can also include files and folders that are present in a special Thumbtop directory on the ePMD.

Figure 3:
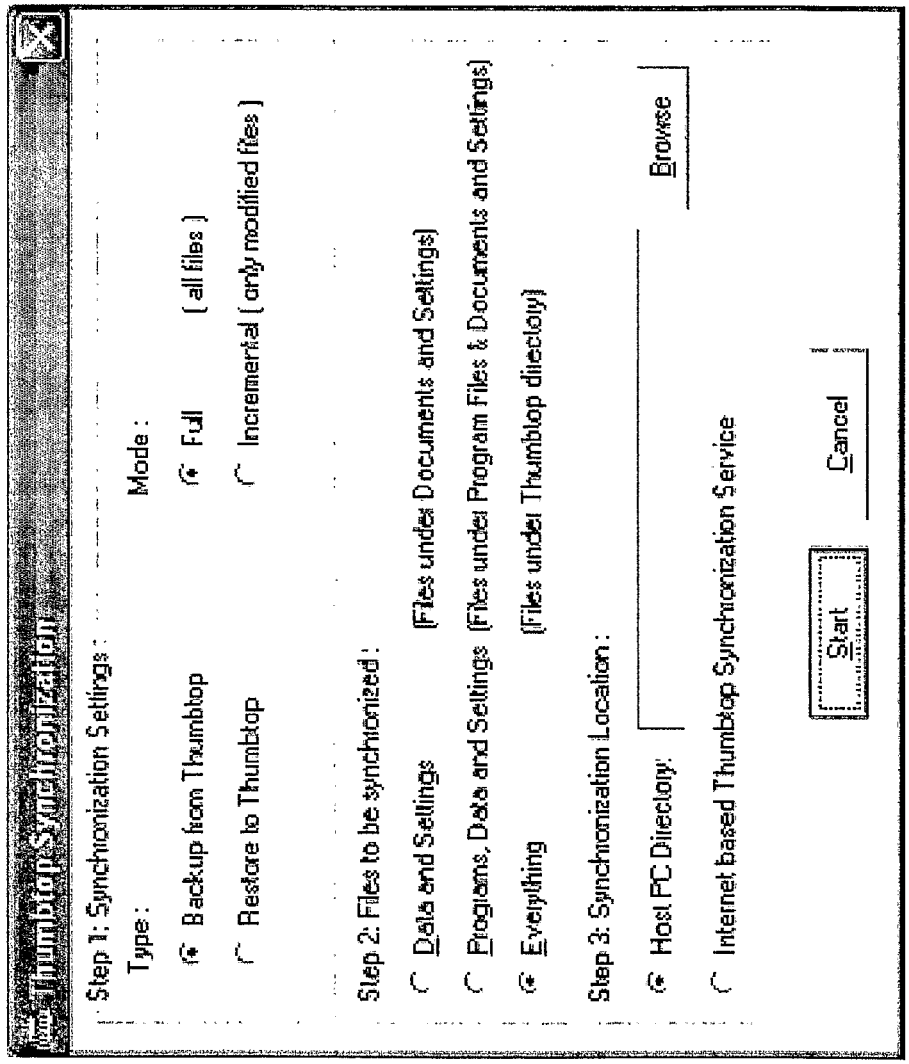
FIG. 3 is an exemplar screen shot depicting synchronization according to an alternate embodiment.

As can be understood by referring to FIG. 3 showing a synchronization screen shot 300 presented to a User, the User can synchronize the data on Thumbtop with his or her desktop by double-clicking the ThumbSync application on the Thumbtop icon. The synchronization program allows a User to synchronize the data alone, programs and data, or everything under the Thumbtop directory to a User's selected location. The synchronization program supports the following modes: Time-stamp based; Desktop to Thumbtop (Forced); Thumbtop to Desktop (Forced). A further description follows below.

Description of the workings of a Synchronization Service for Portable Devices like USB Flash Memory and others The following is a description of synchronization according to the preferred embodiment:

Step 1. For synchronization to take place, a synchronization application running on the "enabled Portable Memory Device" (ePMD) communicates over a network, with an application on the synchronization service website or with the host computer itself.

The synchronization application is run on the host computer—the computer to which the ePMD is connected. The ePMD's notion of current time is also determined by the host computer's notion of current time.

The synchronization application on the ePMD may run within a browser as a java script or a browser plug-in, or as a separate standalone application. The communication between the application on the ePMD (e.g., Thumbsync in the preferred embodiment) and the application on the synchronization service website may be encrypted for security. The files kept on the synchronization service website may also be stored in an encrypted manner and/or compressed for more compact storage on the website.

Initially, the User is required login to a synchronization service website, although thereafter all steps, including login, may be automated.

Step 2. A User chooses one of the following three options:
1. Forced copy from ePMD to Internet or Host computer based repository 2. Forced copy from Internet or Host computer based repository to ePMD.
3. Synchronization of the contents of the ePMD with Internet or Host computer based repository (default)

In an alternate embodiment shown in FIG. 3, these options could be represented as backup and restore from either a host computer or website.

For each of the three options, a confirmation prompt is displayed. A sub-option to specify the synchronization of only some part of the contents (such as, for example, data files only) may also be provided. In such a case, the following steps will apply only to the selected section of the contents.

Step 3. If the User chooses Option 1 (i.e., forced copy from ePMD to Website), a File-List is generated on the ePMD and compared to a similar File-List on the website to see if there are any files on the website that are not present on the ePMD. If files exist on the website that are not present on the ePMD, a confirmation screen is first displayed to the User to ask the User's permission for each file deletion.

The screen is of the format
"Yes,
YesToAll,
No,
NoToAll,
CopyToPortableDevice,
CopyAllToPortableDevice".

Based on the User selection, the files are deleted or left untouched on the synchronization service website, or copied back to the ePMD. All the files from the ePMD are then copied over to the synchronization service website. The timestamps of the files on the ePMD are preserved on its copy on the synchronization service website.

After the copy is completed, a new File-List is created on the synchronization service website which includes the names of all the files/directories, their size and their timestamp. "Current time" according to the ePMD and according to the synchronization service website are also written in this file. A log is maintained for all the files copied/deleted.

Step 4. If the User chooses Option 2 (i.e., forced copy from Website to Portable Device), a File-List is generated on the ePMD and compared to a similar File-List on the synchronization service website to determine if there are any files on the ePMD that are not present on the synchronization service website. If it is the case, that there are files present on the ePMD that are not present on the synchronization service website, a confirmation screen is first displayed to the User to ask the User's permission for each file deletion.

In the preferred embodiment, the confirmation screen is of the format
"Yes,
YesToAll,
No,
NoToAll,
CopytoWebsite,
CopyAllToWebsite".

Based on the User selection, the files are deleted or left untouched on the ePMD, or copied back to the synchronization service website. The files from the synchronization service website are then copied over to the ePMD.

After the copy is completed, the synchronization service website's File-List is updated to include the current time according to the ePMD's and according to the synchronization service website application. A log is maintained for all the files copied/deleted.

Step 5. If the User chooses Option 3 (i.e., Synchronization of contents), a File-List is generated on the ePMD and compared to a similar File-List on the synchronization service website. The File-List, as mentioned earlier, contains the names of files, their sizes and timestamps. The synchronization service website File-List also contains the ePMD's (P1) current time and website's (W1) current time at the last time the synchronization was carried out. The ePMD's notion of current time (P2) is once again compared with the synchronization service website's notion of current time (W2) and a difference (D) computed ((P2−W2)−(P1−W1)). If (D) is a positive number that would indicate that the ePMD's notion of time has advanced compared to the synchronization service website since the last synchronization.

If (D) is a negative number that would indicate that the ePMD's notion of time has fallen back compared to the synchronization service website since the last synchronization.

a. If the file name is the same, the size is the same and the timestamps are the same on the ePMD and on the synchronization service website, then nothing is done.
b. If the file name is the same, and the size is different, and the timestamp on the ePMD is later than the one on the synchronization service website, then the file on the ePMD is copied over to the synchronization service website.
c. If the file name is the same, and the size is different, and the timestamp on the ePMD is earlier or same as the one on the synchronization service website, then the difference D is looked at.

If the difference D is positive or zero, then the file on the synchronization service website is copied over to the ePMD. If the difference D is negative, and if the difference in the timestamps of the file is more than D, then the file on the ePMD is copied on to the synchronization service website. If the difference D is negative, and if the difference in the timestamps of the file is less than D, then the file on the synchronization service website is copied over to the ePMD.

If there is an extra file on the synchronization service website, and its time is before the last time of synchronization, then it is deleted from the synchronization service website. If there is an extra file on the synchronization service website and its time is after the last time of synchronization, then it is copied to the ePMD. If this is an extra file on the ePMD, then it is copied over to the synchronization service website.

A new File-List is once again created on the synchronization service website. The ePMD's notion of current time and the synchronization service website application's notion of current time are also written in this file. A log is maintained for all the files copied/deleted.

Encapsulation and Learning. The preferred embodiment of the invention also provides Encapsulation and Learning, conceptually depicted in FIGS. 4a, 4b and 4c and discussed herein below Encapsulation: In order to ensure that the applications running on Thumbtop (i.e., a Thumbtop enabled PMD=ePMD) save their changes on the ePMD drive itself and not on the connected host computer, Thumbtop modifies the environment in which the applications are running by encapsulating the applications. The process of encapsulation (i.e., modification of the runtime environment of applications so that the ePMD's access to the host computer is monitored and restricted if desired) is done by Thumbtop in a number of ways, one of which described below.

The invention provides a mechanism to replace calls to standard dynamically loaded libraries (dlls) with its own library calls via the Thumbsafe.dll that is included in the bin directory. Library calls on an ePMD can then intercept the requests made by the application to examine/modify the contents of the connected host computer and make the application either examine/modify the contents of the ePMD, or warn the User and ask permission before the modifications are made to the connected host computer.

Learning: Replacement of calls to standard dynamically loaded libraries with Thumbtop's own library calls also provides a mechanism to learn the dependencies of an application on the environment of the connected host computer and duplicate them within the environment of the ePMD. Learning application dependencies and duplicating them within the ePMD environment makes it possible to free the application from running only on the installed computer (i.e., the computer on which the application was originally installed) and run off an ePMD connected to any host computer.

In the example below, the case of registry entries is described. However, it should be understood that the same mechanism can be applied to "learn" other components of the environment provided on the host computer like files and environment variables.

At the time a third party application program is originally installed on the host computer, the application program makes certain changes to the host computer's registry. Later, when the application queries the host computer registry, if the certain registry changes are not found, the application may fail to run.

In the case where the application is running on the host computer on which it is installed, the application, using the standard dynamically loaded library calls, reads the registry information on the host computer and also modifies it if necessary. Such a situation is depicted in FIG. 4a: a first computer 104 has a first registry with application initiated modification 1006; a standard dll call 1004 to the registry 1008 obtains a application data-containing response 1010 and the application 1002 may be successfully invoked.

Figure 4B:
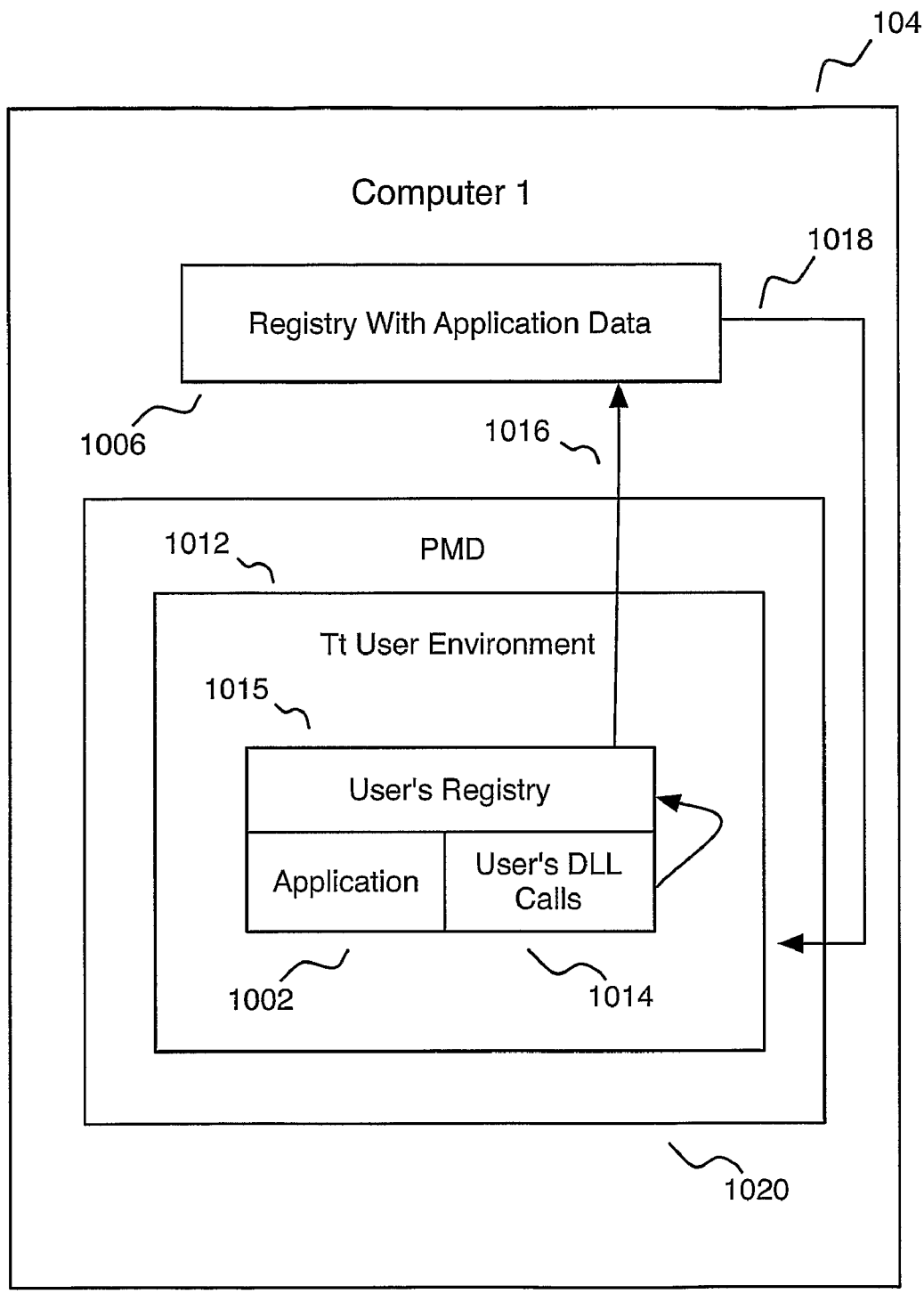
Figure 4C:
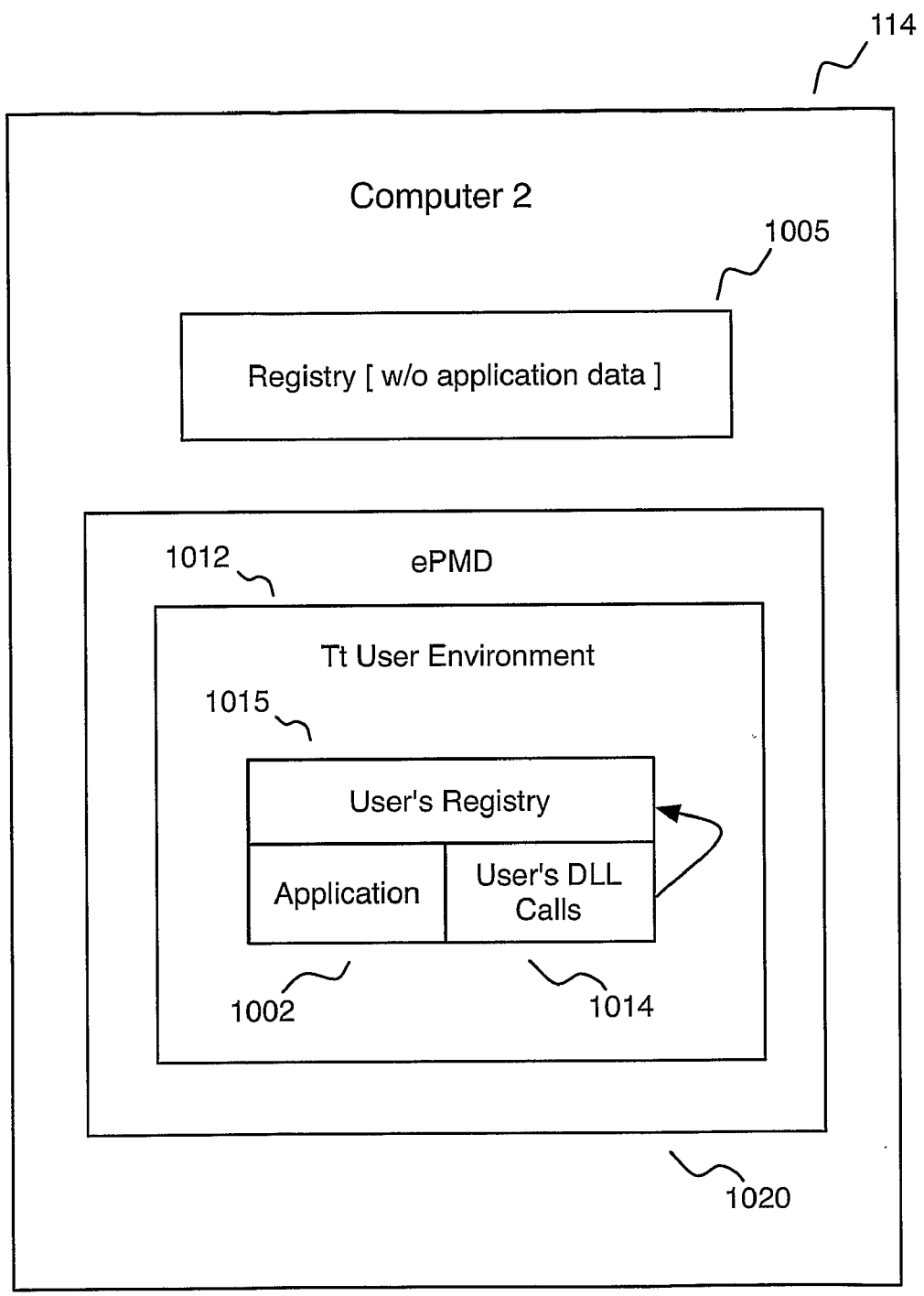

The preferred embodiment of the invention provides that where an ePMD is then connected to the first computer, the application 1002 is copied on enabled portable memory device (ePMD) device and invoked from within the Thumbtop environment. FIG. 4b illustrates the manner in which an ePMD 1020 connected to a first (host) computer 104, uses the portable Thumbtop environment 1012 containing the application 1002, user registry 1015 and dll calls 1014 to connect with the first computer 104 registry with application initiated modification 1006, and to provide an application data-containing response 1018 in the user environment 1012.

So, as depicted in FIG. 4b, when the application in invoked from within Thumbtop's runtime environment, as part of encapsulation, Thumbtop.dll will replace the standard dynamically loaded library calls to the registry with its own dynamically loaded dll calls.
a) When a query is made to read the registry, Thumbtop.dll will first examine the local Thumbtop's registry 1015 that resides on the portable storage device.
b) If the information is present on the ePMD, thumbtop.dll will provide the information to the application right away.
c) If the information is not found, thumbtop.dll will make the standard dynamically loaded library registry call which reads the real registry 1006 on the host computer to which the ePMD is connected. It will then copy this information into the local Thumbtop's registry and then supply the information to the application.
d) When a query is made to write into the registry, Thumbtop's dlls will modify the local Thumbtop's registry only. If an entry does not exist in the local Thumbtop registry, an entry will be created and the new value stored.

As a result, now the application is free to run off the ePMD since its dependencies on the contents of the registry 1006 on the installed (first host) computer have been "learned" and duplicated in Thumbtop's registry 1015 that resides on the ePMD itself.

Thus when running on a different computer, Computer 2, as shown in FIG. 10c, which did not have the application originally installed on it and its registry does not include the application data, when the application makes a call to read the registry, the Thumbtop's replacement dll calls will first examine the local Thumbtop's registry 1015 and it will find the information it was looking for, thus not requiring it to go to the connected host computer's registry at all.

Learning also includes the ability to tokenize some specific values from Computer 1 (computer on which learning is conducted), so that they can be replaced, at runtime, by the information on Computer 2 (host computer that Thumbtop is currently connected to). The term "tokenize" is a term understood by those of skill in the relevant art and is used in the generally understood sense.

As it has been shown hereinabove, the invention provides: first, the portable customizable desktop dubbed "Thumbtop"; second, a synchronization means by which the User updates or synchronizes his or her Thumbtop files with "home" files; third, a method of learning and encapsulation by which the Thumbtop automates the duplication of a programs run-time environment and prevents the contamination of the host device the Thumbtop portable desktop may be run upon.

One application of the invention is in the domain of IT (information technology) support. An IT person can take Thumbtop—an environment and programs—to the device under test (DUT) and perform a local run for diagnostic purposes.

Another application of the invention can be in the form of a "branded desktop". Large internet related service providers, such as, for example, Yahoo! or Google, can support a desktop interface specifically aimed at Thumbtop users.

Yet another application is voice over IP (VOIP). A Thumbtop user may take his or her VOIP data (from, for example, providers such as Skype, or others) and complete telephone directory on an ePMD. A traveler stopping in at an internet café in Europe or Asia Pacific, for example, may use Thumbtop as a VOIP enabling device just as if the traveler were in their own home.

Other variations and applications will be apparent to persons skilled in the art. The scope of this invention should therefore not be determined solely by with reference to the above description and examples therein, but instead should be determined inclusive of reference to the appended claims and figures, along with the full scope of equivalents to which such claims are entitled.

We claim:

1. A method for encapsulating launched applications within a portable environment, said method comprising the steps of:
 a) replacing the standard dynamically loaded library calls with portable environment dynamically loaded dll calls;
 b) monitoring access to currently connected computer's environment, where such environment includes registry, files, and environment variables;
 c) restricting modifications made to the currently connected computer's environment, if desired; and
 d) making these modifications in the portable environment's local repository, if desired.

2. A method for learning dependencies when an application is invoked from within a portable environment residing in a portable memory device and where said environment is connected to a host, said method comprising the steps of:
 a) replacing the standard dynamically loaded library calls with portable environment dynamically loaded dll calls;

b) upon any query to read the currently connected system environment, said portable environment first examines its local repository that resides on the portable memory device;
   i. if the information is present, providing the information to the application right away;
   ii. if the information is not found:
      1. making the standard dynamically loaded library call which reads the real system environment on the host computer to obtain information;
      2. copying the information into the portable environment repository, where such copying may include tokenizing the information, if necessary; and
      3. supplying the information to the application.

3. A method as in claim 2 wherein the system environment variables include one or more of the variables of registry, data and environment.

4. A method as in claim 3, wherein the query is made to write to a registry, and where, if an entry does not exist in the portable environment registry,
   a. creating an entry; and
   b. storing the new value.

5. A method as in claim 2, further including the steps of:
   a) when a query is made to write into the system environment modifying the portable environment only.

* * * * *